(12) United States Patent
Risse et al.

(10) Patent No.: US 8,660,745 B2
(45) Date of Patent: Feb. 25, 2014

(54) CONTROL ARRANGEMENT FOR A TRAILER VEHICLE

(75) Inventors: Rainer Risse, Pattensen-Reden (DE);
Udo Ronnenberg, Wedemark (DE);
Axel Stender, Hameln (DE)

(73) Assignee: WABCO GmbH, Hannover (DE)

( * ) Notice: Subject to any disclaimer, the term of this patent is extended or adjusted under 35 U.S.C. 154(b) by 275 days.

(21) Appl. No.: 13/127,125

(22) PCT Filed: Aug. 1, 2009

(86) PCT No.: PCT/EP2009/005590
§ 371 (c)(1),
(2), (4) Date: Jun. 13, 2011

(87) PCT Pub. No.: WO2010/060493
PCT Pub. Date: Jun. 3, 2010

(65) Prior Publication Data
US 2011/0257840 A1  Oct. 20, 2011

(30) Foreign Application Priority Data
Nov. 3, 2008  (DE) .......................... 10 2008 054 366

(51) Int. Cl.
*B60T 7/20* (2006.01)
*B60T 8/32* (2006.01)
*B60T 13/66* (2006.01)

(52) U.S. Cl.
USPC ................................ 701/36; 701/70; 280/422

(58) Field of Classification Search
None
See application file for complete search history.

(56) References Cited

U.S. PATENT DOCUMENTS

| 5,458,357 | A |   | 10/1995 | Wohlhuter |
| 5,677,667 | A | * | 10/1997 | Lesesky et al. ............... 340/431 |
| 5,739,592 | A | * | 4/1998 | Rigsby et al. ................. 307/9.1 |
| 6,970,772 | B2 | * | 11/2005 | Radtke et al. ..................... 701/1 |
| 7,347,507 | B1 |   | 3/2008 | Stillinger |
| 2003/0222774 | A1 |   | 12/2003 | Koenigsberg |
| 2005/0184859 | A1 | * | 8/2005 | Li ................................. 340/435 |
| 2006/0244305 | A1 |   | 11/2006 | Hilberer |

FOREIGN PATENT DOCUMENTS

| DE | 37 26 822 A1 |   | 12/1988 |
| DE | 10130544 A1 | * | 1/2003 |
| FR | 1 236 432 A |   | 6/1960 |
| GB | 2 204 844 A |   | 11/1998 |
| GB | 2 425 760 A |   | 11/2006 |
| WO | WO 2005/102744 A1 |   | 11/2005 |
| WO | WO 2006/032355 A1 |   | 3/2006 |
| WO | WO 2006/066819 A1 |   | 6/2006 |
| WO | WO 2008/038313 A1 |   | 4/2008 |

* cited by examiner

*Primary Examiner* — Michael J Zanelli
(74) *Attorney, Agent, or Firm* — Kramer Levin Naftalis & Frankel LLP

(57) ABSTRACT

A control arrangement for a trailer vehicle comprises a brake system, a lighting system, a control device for controlling the lighting system, and a data transfer system for transferring data between the control device and the brake system. The control device and the brake system are arranged such that information about the status of the lighting system is transferred to the brake system by means of the control device, and/or information about the brake system is transferred to the control device for changing the status of the lighting system.

13 Claims, 1 Drawing Sheet

CONTROL ARRANGEMENT FOR A TRAILER VEHICLE

FIELD OF THE INVENTION

The present invention generally relates to a control arrangement for a trailer vehicle, and also to a trailer vehicle having such a control arrangement.

BACKGROUND OF THE INVENTION

Trailer vehicles that have a brake system, a light system and a control device for controlling the light system are known. The brake system has the function of controlling the braking behavior of the trailer vehicle. The light system comprises various light elements, for example brake lights, reversing lights, turn signals or side marker lights. The status of the light system can be changed by means of the control device, for example a brake light, a reversing light, a turn signal, a warning light and/or a side marker light can be activated or deactivated.

SUMMARY OF THE INVENTION

Generally speaking, it is an object of the present invention to increase the functionality of a control arrangement that comprises a brake system, a light system and a control device for controlling the light system. A further object is to provide a trailer vehicle having a control arrangement of this kind.

The control arrangement, according to the inventive embodiments, for a trailer vehicle comprises a brake system, a light system, a control device for controlling the light system, and a data transmission system for transmitting data between the control device and the brake system, wherein the control device and the brake system are designed such that information about the status of the light system is transmitted to the brake system by means of the control device and/or information in the brake system is transmitted to the control device for the purpose of changing the status of the light system.

The inventive control arrangement enables the brake system to use information about the status of the light system to control the braking behavior of the trailer vehicle. Conversely, the status of the light system can be actively influenced by the brake system. In addition, high-impedance or DC decoupling between the brake system and the light system can be achieved on account of information about the status of the light system being transmitted to the brake system by means of the control device and the brake system influencing the light system indirectly via the control device.

By way of example, the brake system can read-in the status of a reversing light of the light system without additional cabling in order to identify an ongoing reversing operation, identify imminent cornering on the basis of the status of a turn signal of the light system, and, in the event of an active warning light of the light system, set a safe chassis state or an unloading level. In the event of automatic driving dynamics interventions in the brake system, the brake system can, for example, actively actuate brake lights of the light system by means of the control device or, in the event of activation of a ramp approach assistant, actuate clearance lamps of the light system.

The control arrangement preferably comprises a sensor system that can be controlled by means of the control device. The sensor system can comprise, in particular, distance sensors for monitoring the area behind the vehicle, door switching contacts and/or temperature sensors. The control device and the brake system are advantageously designed such that information in the sensor system can be transmitted to the brake system by means of the control device. This enables the brake system to influence the braking behavior of the trailer vehicle on the basis of information in the sensor system.

At least some of the light elements of the light system and/or the sensors of the sensor system are preferably connected to the control device via a common bus. In comparison with an individual wiring system, which is likewise possible, the amount of cabling and outlay on installation, in particular, can be reduced by using a common bus.

Still other objects and advantages of the present invention will in part be obvious and will in part be apparent from the specification.

The present invention accordingly comprises the features of construction, combination of elements, and arrangement of parts all as exemplified in the constructions herein set forth, and the scope of the invention will be indicated in the claims.

BRIEF DESCRIPTION OF THE DRAWINGS

The invention will be explained in greater detail below with reference to an exemplary embodiment, which is illustrated in the appended drawing FIGURE, in which.

DETAILED DESCRIPTION OF THE PREFERRED EMBODIMENTS

Figure 1:
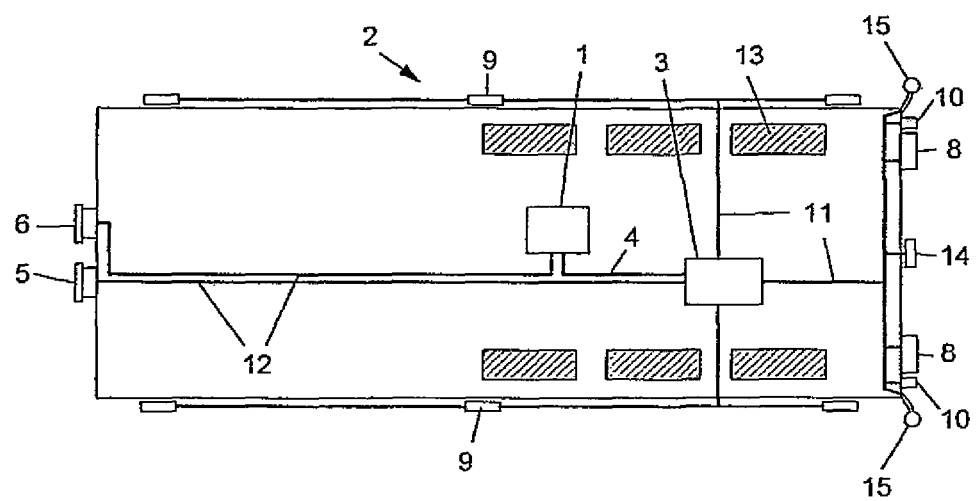
FIG. 1 schematically depicts a trailer vehicle having a control arrangement according to an exemplary embodiment of the invention.

FIG. 1 shows the trailer vehicle in the form of a semitrailer of a semitrailer tractor. It has three wheel axles in the rear region. The wheel axles are symbolically indicated by wheels 13.

The control arrangement comprises a brake system, a light system 2, a control device for controlling the light system 2, a data transmission system 4 for transmitting data between the control device and the brake system, and a sensor system. In this case, the brake system is an electronic brake system, which is known per se, and which has a brake modulator 1 with an integrated control unit for controlling wheel brakes (not illustrated in any detail) associated with the wheels 13 of the trailer vehicle. The light system 2 comprises two combined rear lights 8, a brake light, a reversing light, a turn signal and a warning light being integrated in each of the rear lights, and also a plurality of side marker lights 9 and license plate lighting 14. The rear lights 8 are arranged on the right- and left-hand sides of the rear of the vehicle and the license plate lighting 14 is arranged in the center of the rear of the vehicle. The side marker lights 9 are located on the left-hand and on the right-hand side of the trailer vehicle. Furthermore, the light system 2 comprises two clearance lamps 15, which are likewise arranged on the right-hand and on the left-hand side of the rear of the vehicle. The rear lights 8, clearance lamps 15, side marker lights 9 and license plate lighting 14 are connected to a central electronic control unit 3, which forms the control device in this case, via a cabling system. The sensor system comprises two distance sensors 10, a door switching contact (not illustrated) and a temperature sensor (not illustrated). The distance sensors 10 are arranged on the right- and left-hand sides of the rear of the vehicle. The distance sensors serve to monitor the area behind the vehicle, in particular as part of a ramp approach assistance system. The distance sensors 10 are formed by ultrasound sensors in this case.

The elements of the light system 2, that is the rear lights 8, the side marker lights 9, the clearance lamps 15 and the license plate lighting 14, and the elements of the sensor system, that is the distance sensors 10, the door switching contact and the temperature sensor, are connected to the central control unit 3 by means of a common bus 11. The bus 11 comprises a data line and two supply lines. The data line serves to transmit data and the supply lines serve to supply power to the elements of the sensor system and light system. It is possible, in particular, to use the data line to control the elements of the sensor system and of the light system 2, for example to activate or to deactivate the brake lights or a turn signal, or to transmit measurement data from the sensor elements or status information from the elements of the light system 2 to the central control unit 3. The central control unit 3, the elements of the light system 2 and the elements of the sensor system are formed with suitable interfaces for connection to the bus 11.

As an alternative, it is possible to provide individual wiring systems in some areas or throughout. The individual wiring systems can lead from the central control unit 3 to a respective element of the light system 2 or of the sensor system.

The trailer vehicle has a first connection 5 for connection of the central control unit 3 to a truck. The first connection 5 is formed in accordance with ISO12098 in this case. A second connection 6 for connection of the brake modulator 1 to the truck is also provided. The second connection 6 is formed in accordance with ISO7638 in this case. The first connection 5 and the second connection 6 are arranged on the front of the trailer vehicle at the truck end and are, in each case, connected to the brake modulator 1 or to the central control unit 3 via an electrical cabling system 12.

The central unit 3 and the brake modulator 1 are designed, for example, using suitable electronic components and programs such that information about the status of the light system 2 is transmitted to the brake modulator 1 by means of the central control unit 3 and information in the brake system is transmitted from the brake modulator 1 to the central control unit 3 for the purpose of changing the status of the light system 2. Furthermore, the central control unit 3 and the brake modulator 1 are designed such that information in the sensor system is transmitted to the brake modulator 1 of the brake system by means of the central control unit 3. This transmission takes place via the data transmission system 4, which, in this case, is in the form of a bus 4 that connects the brake modulator 1 and the central control unit 3 to one another, wherein the brake modulator 1 and the central control unit 3 have interfaces that are suitable for the connection operation. An individual wiring system would also be possible as an alternative. The bus 4 has at least one data line for transmitting data.

Therefore, information about the status of the light system 2 and information in the sensor system, in particular measurement data, are indirectly available to the brake system via the central control unit 3. This information can be used to improve the braking behavior of the trailer vehicle in a manner controlled by the brake system. Furthermore, the brake system can influence the status of the light system 2. For example, the brake system can activate brake lights or warning lights, via the central control unit 3. Since power is supplied to the elements of the light system 2 and of the sensor system by the central control unit 3, the brake system is electrically decoupled from the light system 2 and the sensor system.

In an alternative embodiment, the connection 6 is not connected to the brake modulator 1, but rather to the central control unit 3. The brake system therefore receives signals from a truck and the electrical power supply via the central control unit 3. The bus 4 has lines that are suitable for this purpose, in this case a data bus line for transmitting data and lines for electrical power supply.

It will be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A control arrangement for a trailer vehicle, the control arrangement comprising a trailer brake system, a trailer light system, a control device for controlling the light system, and a data transmission system for transmitting data between the control device and the brake system, wherein the control device and the brake system are configured such that at least one of information about the status of the light system is transmitted to the brake system by means of the control device and information in the brake system is transmitted to the control device to change the status of the light system.

2. The control arrangement as claimed in claim 1, wherein the brake system includes a brake modulator, and the data transmission system is configured to transmit data between the control device and the brake modulator.

3. The control arrangement as claimed in claim 1, wherein the control device includes a central control unit.

4. The control arrangement as claimed in claim 1, wherein the data transmission system comprises at least one of a data bus and at least one individual wiring system.

5. The control arrangement as claimed in claim 1, further comprising a first connection for connecting the control device to a truck.

6. The control arrangement as claimed in claim 1, further comprising a second connection for connecting the brake system to a truck.

7. The control arrangement as claimed in claim 1, further comprising a sensor system controllable by the control device.

8. The control arrangement as claimed in claim 7, wherein the control device and the brake system are configured such that information in the sensor system is transmittable to the brake system by the control device.

9. The control arrangement as claimed in claim 7, wherein at least one of the light system and the sensor system is connected to the control device via at least one of a bus and at least one individual wiring system.

10. The control arrangement as claimed in claim 7, wherein the sensor system comprises at least one of a distance sensor, a door switching contact and a temperature sensor.

11. The control arrangement as claimed in claim 1, wherein the light system comprises at least one of a brake light, a reversing light, a turn signal, a warning light, a clearance lamp and a side marker light.

12. The control arrangement as claimed in claim 1, wherein the brake system is an electronic brake system.

13. A trailer vehicle, comprising a control arrangement as claimed in claim 1.

* * * * *

UNITED STATES PATENT AND TRADEMARK OFFICE
CERTIFICATE OF CORRECTION

PATENT NO. : 8,660,745 B2  Page 1 of 1
APPLICATION NO. : 13/127125
DATED : February 25, 2014
INVENTOR(S) : Risse et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 316 days.

Signed and Sealed this

Twenty-ninth Day of September, 2015

Michelle K. Lee
*Director of the United States Patent and Trademark Office*